United States Patent

[11] 3,604,538

| [72] | Inventor | John B. Tompkin<br>Tyseley, England |
|---|---|---|
| [21] | Appl. No. | 813,122 |
| [22] | Filed | Apr. 3, 1969 |
| [45] | Patented | Sept. 14, 1971 |
| [73] | Assignee | Girling Limited<br>Birmingham, England |
| [32] | Priority | Apr. 11, 1968, Oct. 30, 1968 |
| [33] | | Great Britain |
| [31] | | 17,716/68 and 51,449/68 |

[54] RAILWAY VEHICLE BRAKES
2 Claims, 5 Drawing Figs.

[52] U.S. Cl. .................................................. 188/59,
188/72.6, 188/72.9, 188/206
[51] Int. Cl. ................................................... B61h 5/00
[50] Field of Search ........................................ 188/59,
206, 72.6, 72.9

[56] References Cited
UNITED STATES PATENTS

| 2,343,342 | 3/1944 | Tack | 188/59 |
| 2,410,574 | 11/1946 | Ekserjian | 188/59 UX |
| 2,584,940 | 2/1952 | Tack | 188/59 |
| 2,791,294 | 5/1957 | Bachman et al. | 188/59 |
| 2,815,095 | 12/1957 | Polanin | 188/206 X |
| 2,877,871 | 3/1959 | Tack | 188/59 |
| 3,048,240 | 8/1962 | Helsten | 188/59 X |
| 343,680 | 6/1886 | Tribe | 188/594 X |

*Primary Examiner*—George E. A. Halvosa
*Attorney*—Scrivener, Parker, Scrivener and Clarke ABSTRACT: A railway vehicle disc brake which comprises a yoke, a pair of opposed caliper levers pivotally mounted on the yoke, a pair of brakeshoes one pivotally mounted at the inner end of each lever, an actuating motor for separating the outer ends of the levers to move the shoes towards each other, whereby in use the said shoes can be applied to opposite sides of a brake rotor which comprises a disc or discs mounted for rotation with a wheel of the vehicle, and a suspension link for each shoe, each link being pivotally connected at one end to its shoe and at its other end to a rigid support structure and serving in use to resist pivotal movement of the shoe about its pivotal connection with the caliper lever, relative to the brake rotor, wherein the rigid support structure is fast with the yoke and resilient suspension means are provided for mounting the yoke on a railway vehicle frame in a manner accommodating some misalignment between the vehicle frame and the brake rotor without any corresponding reaction being transmitted back to the vehicle frame during braking.

RAILWAY VEHICLE BRAKES

This invention relates to disc brakes for railway vehicles and provides further improvements in the brake constructions described in U.S. Pat. No. 3,507,364.

The above-mentioned specification describes a railway vehicle disc brake comprising a yoke, a pair of opposed caliper levers pivotally mounted on the yoke, a pair of brakeshoes one pivotally mounted at the inner end of each lever, an actuating motor for separating the outer ends of the levers to move the shoes towards each other, whereby in use the said shoes can be applied to opposite sides of a brake rotor comprising a disc or discs mounted for rotation with a wheel of the vehicle, and a suspension link for each shoe, each link being pivotally connected at one end to its shoe and at its other end to a rigid support structure and serving in use to resist pivotal movement of the shoe about its pivotal connection with the caliper lever, relative to the brake rotor.

In the particular constructions described and illustrated in that specification, the said links are connected directly to the vehicle bogie frame, and they prevent rotation of the brakeshoes, relative to the brake rotor, about their pivotal connections with the caliper levers. It has been found that this arrangement is satisfactory in cases in which the yoke can tilt up to about 3° relative to the bogie frame, this degree of tilting being accommodated by manufacturing tolerances and structural deflections. However, if the vehicle is likely in practice to experience roll in excess of about 3° in either direction, the restraining effect of the links tends to be transmitted back to the yoke, which can therefore no longer tilt sufficiently to allow the shoes to remain parallel with the brake rotor.

The present invention seeks to overcome this drawback, and in accordance with the invention, the rigid support structure (which carries the links) is fast with the yoke and resilient suspension means are provided for mounting the yoke structure on a railway vehicle bogie frame in a manner accommodating some misalignment between the bogie frame and the brake rotor without any substantial reaction being transmitted back to the bogie frame during braking. With this arrangement, the links still serve the function of restraining the brake shoes against pivotal movement, relative to the brake rotor, about their pivotal connections to the caliper levers, but since they are now supported by a structure fast with the yoke, they do not resist any tendency of the yoke to tilt in its resilient suspension, so that the brakeshoes can be maintained parallel with the brake rotor within the limits of angular movement imposed by the suspension itself. Drag forces taken out by the links are, of course, transmitted back to the yoke.

A further problem dealt with by the invention is that arising from the conventional arrangement of disc brakes on railway vehicle bogies, in which two brakes are fitted to a bogie one to each of a pair of diagonally opposed wheels.

In accordance with a further feature of this invention, however, two brakes are fitted to the two wheels on one side of a bogie, each beyond the wheel with which it cooperates, so that the brakeshoes of the front brake are forward of the front axle, and those of the rear brake are rearward of the rear axle. With this arrangement, the bogie side frame member from which the brakes are supported is subjected, during braking, to opposite and substantially equal reaction couples tending to tilt the bogie frame about its center, without affecting the level at which the body of the vehicle rides.

One particular form of disc brake in accordance with the invention, and a modification, will now be described, by way of example only, with reference to the accompanying drawings, in which.

Figure 1:
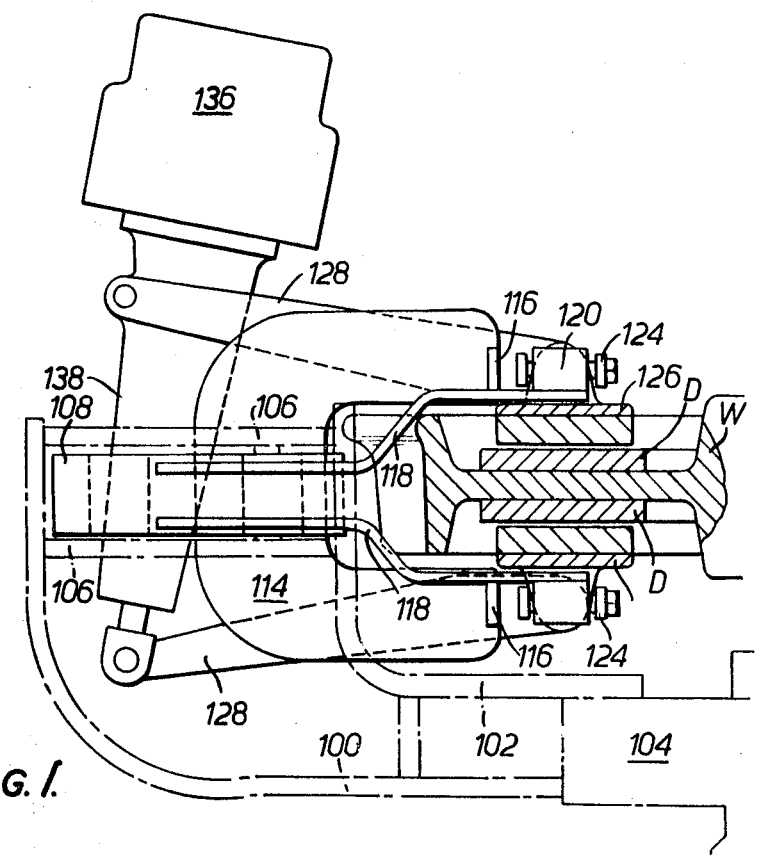
FIG. 1 and 2 are a plan view and a side view of one form of railway vehicle disc brake.
Figure 2:
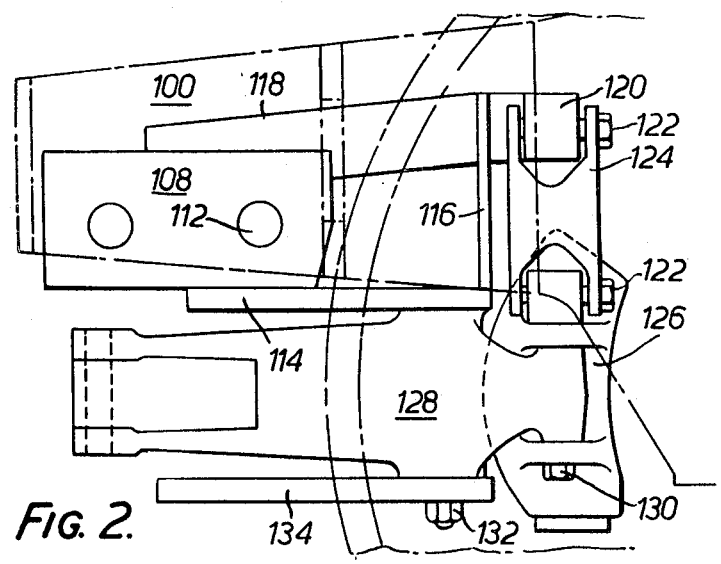
Figure 3:
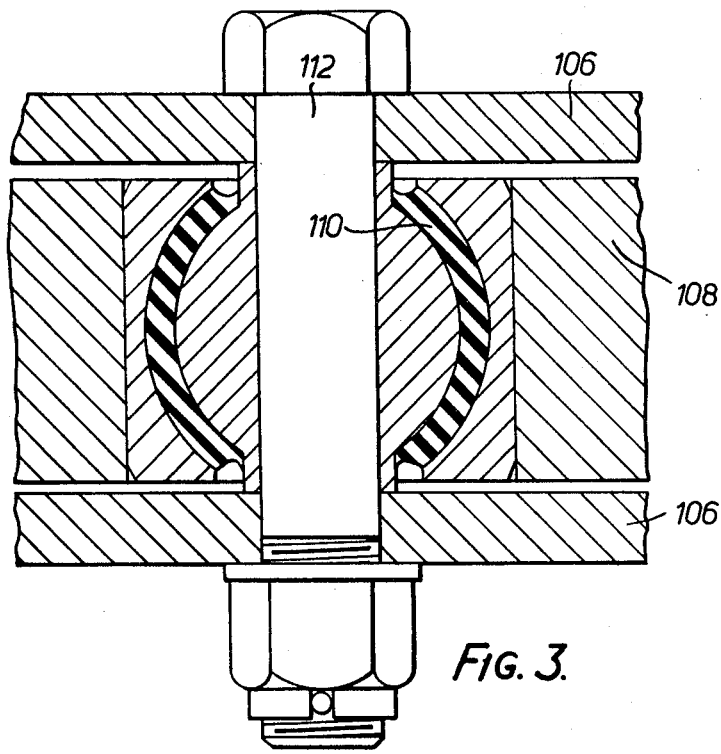
FIG 3 is a section, on a larger scale, taken on the line III—III in FIG. 2.

The brake shown in FIGS. 1 to 3 is mounted on a railway vehicle bogie by a rigid mounting structure comprising a pair of generally L-shaped brackets 100, 102 welded to the adjacent end of the bogie side frame member 104. Two flat plates 106 are welded between the two brackets, at one end thereof, to form a housing for a mounting block 108 apertured to receive two spherical rubber bushes 110, through which extend mounting pins 112 secured at their outer ends to plates 106. An upper yoke member 114 is welded to the underside of mounting block 108 and has welded to the free ends of its arms a pair of vertical brackets 116 whose upper ends are welded to respective arms 118 welded in turn to the upper surface of the mounting block 108.

Each of the arms 118 has secured to its free end a boss 120 which receives a pivot pin 122 for pivotally mounting the upper end of an H-link 124, the lower end of which is pivotally connected to a brakeshoe 126. The bifurcated upper and lower ends of the links are each bridged by the pivot pins 122 connecting each link to the arms 118 and brakeshoe 126, respectively.

A pair of brake-actuating caliper levers 128 are pivotally connected to the shoes 126 by shoe pivot pins 130 and are mounted for movement about a vertical axis by pins 132 extending through the arms of upper yoke member 114 and a corresponding lower yoke member 134 rigid with the upper yoke member but spaced from it to accommodate the caliper levers 128. The other ends of the levers 128 are arranged for actuation by an actuator 136 operating through an automatic slack adjuster 138 in known manner.

In use, as illustrated in drawings, the brake is mounted on the bogie in such a manner that the arms 118 and levers 128 extend to either side of a brake rotor, here formed by brake discs D secured to the opposite faces of a wheel W. The levers 128 extend generally horizontally and radially with respect to the axis of the wheel and brake, although the whole brake could obviously be moved round the discs to some extent if desired.

Since the yoke structure (constituted by yoke members 114 and 134) is fast with the rigid support structure (constituted by the arms 118) the yoke and support structure can tilt as one about an axis extending horizontally and generally radially of the axis of the brake disc. In fact, the axis about which the yoke tilts extends transversely to the brake axis and intersects the axes of the mounting pins 112. These pins are spaced apart along the yoke axis, so as to provide resistance to the whole structure turning about an axis parallel with the pins due to the effect of drag forces which are transmitted back through the levers and yoke during braking.

It will be understood that if the brake is applied at a time when the bogie frame is tilted about a longitudinal axis, relative to the wheel axles and brake rotors (as for example when negotiating a curve at speed), the brakeshoes will tend to remain parallel with the brake rotor and the reaction transmitted by the caliper levers 128 will cause the yoke to tilt. Thus, the misalignment, measured in a vertical plane, between the brake rotor and the bogie frame is accommodated by the resilient suspension, without any substantial corresponding reaction being transmitted back to the bogie frame.

The spherical rubber bushes 110 apply a resilient restoring force serving to return the yoke to a central, horizontal position when the brakes are released, and to maintain the yoke in this position until the brakes are next applied.

Preferably, and as indicated in FIGS. 1 and 2, the mounting brackets 100 and 102 extend beyond the adjacent end of the bogie frame side member 104 to which they are secured, so that the brake structure supported by those arms is positioned beyond the axis of the wheel with which it cooperates, i.e., the brakeshoes for the front wheel brake are positioned forwardly of the front axle, and the brakeshoes of the corresponding rear brake are positioned rearwardly of the rear axle. Only one brake is shown in the drawings, but a second brake is mounted at the other end of the same side member 104. With this arrangement, drag forces are transmitted by the two brakes to the side member 104 as opposed couples tending to tilt the bogie frame about its center, so as not to affect the level at which the vehicle body rides. In conventional arrangements, the drag forces tend to pull the bogie frame down, thus affecting the level of the body.

Figure 4:
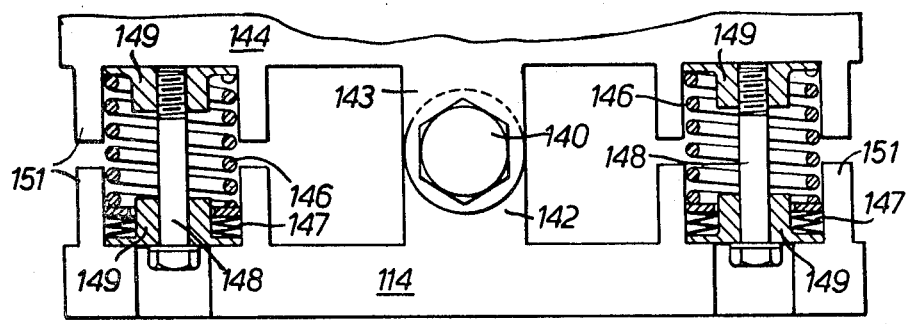
FIGS. 4 and 5 are a part sectional side elevation and an end elevation of a modification.
Figure 5:
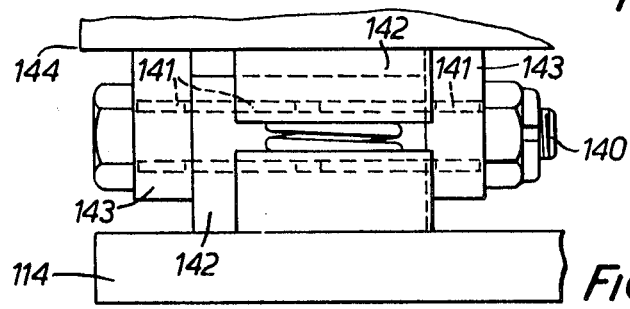

FIGS. 4 and 5 illustrate a modified mounting arrangement. The brake structure is generally similar to that described above, but for some modification to suit the new mounting. The brake structure is supported for angular movement about an axis extending generally radially of the brake rotor and in the central plane thereof by means of a pivot pin 140 which is journaled in plain bushes 141 in a mounting lug 142 on the upper yoke 114 and in ears 143 in a suspension bracket 144 rigidly supported, for example in a pair of brackets (not shown) welded to the bogie frame corresponding to the brackets 100, 102 in FIGS. 1 and 2.

A resilient restoring force tending to maintain the yoke in a central, horizontal attitude is provided by a pair of spring assemblies, one on either side of the pivot pin. Each of these assemblies comprises a coil compression spring 146 and a set of bellevill spring washers 147 whose stiffness is greater than that of the coil spring. The spring assembly is held together during installation by a bolt 148 which is removed when the installation has been completed.

In this embodiment, the coil springs are of different length (and therefore of different preloading) to compensate for the fact that the weight of the suspended brake structure is asymmetrically distributed with respect to the pivot pin 140, due mainly to the actuator being offset.

In use, the spring assemblies tend to maintain the brake structure in a horizontal attitude, but they permit some angular movement, limited by abutments 151, during brake application. Most deflections take place in the coil springs, but the spring washers accommodate any shock loadings or other deflections in the event of the coil springs becoming coil bound.

In both the embodiments described above, it will be seen that the suspended brake structure forms a self-contained unit which can readily be mounted on the bogie frame by what is effectively a single point mounting. This greatly facilitates installation and servicing, and the structure is readily provided on existing rolling stock by securing the rigid mounting structure (comprising arms 100, 102) to the vehicle frame. Although the suspended brake structure preferably includes the actuator motor, it will be appreciated that this could, if desired, be separately mounted on the vehicle and suitably connected to the brake caliper levers 128.

It will be appreciated that the brake construction described herein could be mounted either on the bogie frame of a vehicle having a bogie, or directly on the underframe of a railway vehicle. In the appended claims, the expression "vehicle frame" is intended to cover either case.

I claim:

1. A railway vehicle disc brake for use in combination with a brake rotor having opposed braking surfaces said brake comprising a yoke, a rigid mounting structure, a pivot pin for coupling said yoke to said mounting structure for angular movement about an axis extending generally radially of the brake rotor, a pair of opposed caliper levers pivotally mounted on said yoke, a pair of brakeshoes one pivotally mounted at the inner end of each said lever, actuating motor means for separating the outer ends of said levers to move said shoe towards each other, a rigid support structure fast with said yoke, a pair of suspension links, each having a pair of spaced pivotal connections with said support structure and with a respective one of said shoes, said pivotal connections having fixed axes substantially parallel to the plane of said rotor so as to resist independent angular movement relative to the caliper levers of said shoes about their pivotal connections with said levers, and a pair of spring assemblies disposed on opposite sides of said pivot pin and each acting between said yoke and said mounting structure, said spring assemblies cooperating to apply a resilient force tending to maintain said yoke in a given angular position relative to said mounting structure, each said spring assembly comprising at least two springs arranged in series and having different stiffnesses.

2. A disc brake according to claim 1, wherein each said spring assembly comprises a coil compression spring and a plurality of spring washers.